(12) United States Patent
Lee et al.

(10) Patent No.: US 7,359,901 B2
(45) Date of Patent: Apr. 15, 2008

(54) COMPRESSED DOCUMENT MATCHING

(75) Inventors: Dar-Shyang Lee, Fremont, CA (US);
Jonnathan Hull, San Carlos, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 11/169,359

(22) Filed: Jun. 28, 2005

(65) Prior Publication Data
US 2005/0256857 A1  Nov. 17, 2005

Related U.S. Application Data

(63) Continuation of application No. 10/058,169, filed on Jan. 25, 2002, now Pat. No. 6,928,435, which is a continuation of application No. 09/186,041, filed on Nov. 3, 1998, now Pat. No. 6,363,381.

(51) Int. Cl.
*G06K 9/00* (2006.01)

(52) U.S. Cl. .................... 707/6; 382/181; 345/427
(58) Field of Classification Search ........... 707/1–6; 382/106, 108, 112–113, 168–178, 181, 209, 382/190–204, 217–219, 232–235, 243–244, 382/260–264, 270–273, 276–292; 345/232, 345/427–432
See application file for complete search history.

(56) References Cited

U.S. PATENT DOCUMENTS 4,292,622 A    9/1981   Henrichon, Jr.

(Continued)

FOREIGN PATENT DOCUMENTS

EP    0 581 971 A1    2/1994

(Continued)

OTHER PUBLICATIONS

Marshall et al., "Text Retrieval—Windows File Indexers", InfoWorld v15n21, pp. 123-140, May 24, 1993, ISSN: 0199-6649.*

(Continued)

*Primary Examiner*—Mary D. Cheung
(74) *Attorney, Agent, or Firm*—Blakely, Sokoloff, Taylor & Zafman LLP (57) ABSTRACT

An apparatus and method for determining if a query document matches one or more of a plurality of documents in a database. In a coarse matching stage, a compressed file or other query document is scanned to produce a bit profile. Global statistics such as line spacing and text height are calculated from the bit profile and used to narrow the field of documents to be searched in an image database. The bit profile is cross-correlated with bit profiles of documents in the search space to identify candidates for a detailed matching stage. If multiple candidates are generated in the coarse matching stage, a set of endpoint features is extracted from the query document for detailed matching in the detailed matching stage. Endpoint features contain sufficient information for various levels of processing, including page skew and orientation estimation. In addition, endpoint features are stable, symmetric and easily computable from commonly used compressed files including, but not limited to, CCITT Group 4 compressed files. Endpoint features extracted in the detailed matching stage are used to correctly identify a matching document in a high percentage of cases.

10 Claims, 9 Drawing Sheets

U.S. PATENT DOCUMENTS

| | | | |
|---|---|---|---|
| 4,809,081 | A | 2/1989 | Linehan |
| 4,985,863 | A | 1/1991 | Fujisawa et al. |
| 5,278,920 | A | 1/1994 | Bernzott et al. |
| 5,351,310 | A | 9/1994 | Califano et al. |
| 5,375,176 | A | 12/1994 | Spitz |
| 5,465,353 | A | 11/1995 | Hull et al. |
| 5,579,471 | A | 11/1996 | Barber et al. |
| 5,636,294 | A | 6/1997 | Grosse et al. |
| 5,689,585 | A | 11/1997 | Bloomberg et al. |
| 5,751,286 | A | 5/1998 | Barber et al. |
| 5,761,655 | A | 6/1998 | Hoffman |
| 5,768,420 | A | 6/1998 | Brown et al. |
| 5,806,061 | A | 9/1998 | Chaudhuri et al. |
| 5,809,498 | A | 9/1998 | Lopresti et al. |
| 5,867,597 | A | 2/1999 | Peairs et al. |
| 5,870,754 | A | 2/1999 | Dimitrova et al. |
| 5,892,808 | A | 4/1999 | Goulding et al. |
| 5,893,095 | A | 4/1999 | Jain et al. |
| 5,915,250 | A | 6/1999 | Jain et al. |
| 5,930,783 | A | 7/1999 | Li et al. |
| 5,933,823 | A | 8/1999 | Cullen et al. |
| 5,940,824 | A | 8/1999 | Takahashi |
| 5,940,825 | A | 8/1999 | Castelli et al. |
| 5,987,456 | A | 11/1999 | Ravela et al. |
| 5,995,978 | A | 11/1999 | Cullen et al. |
| 6,006,226 | A | 12/1999 | Cullen et al. |
| 6,026,411 | A | 2/2000 | Delp |
| 6,086,706 | A | 7/2000 | Brassil et al. |
| 6,104,834 | A | 8/2000 | Hull |
| 6,249,604 | B1 | 6/2001 | Huttenlocher et al. |
| 6,268,935 | B1 | 7/2001 | Kingetsu et al. |
| 6,363,381 | B1 | 3/2002 | Lee et al. |

FOREIGN PATENT DOCUMENTS

| | | |
|---|---|---|
| JP | 06-168277 | 6/1994 |

OTHER PUBLICATIONS

Chalana, Vikram, et al., Duplicate Document Detection in DocBrowse, SPIE Conference on Document Recognition V, Mathsoft Data Analysis Products Division, Seattle, Washington, U.S.A., 1998, 10 pages.

Chen, Francine, R., et al., Spotting phrases in lines of imaged text, SPIE Conference On Document Recognition, SPIE vol. 2422, Xerox Palo Alto Research Center, Palo Alto, California, U.S.A., 1995, pp. 256-269.

Chen, Francine R., et al., Detecting and Locating Partially Specified Keywords in Scanned Images using Hidden Markov Models, Proceedings of IDCAR, Xerox Palo Alto Research Center, Palo Alto, California, U.S.A., 1993, pp. 133-138.

Doermann, David, et al., The Detection of Duplicates in Document Image Databases, IEEE, Technical Report CS-TR-3739, University of Maryland, College Park, Maryland, U.S.A., 1997, pp. 314-318.

Doermann, David, et al., Detection of duplicates in document image databases, Image and Vision Computing, V 16 n 12-13, University of Maryland, College Park, Maryland, U.S.A., Aug. 24, 1998, Abstract, 1 page.

Doermann, David, The Retrieval of Document Images: A Brief Survey, Proceedings of the 4th IDCAR, University of Maryland, College Park, Maryland, U.S.A., IEEE 1997, pp. 945-949.

Faloutsos, C., et al., Efficient and Effective Querying by Image Content, Journal of Intelligent Information Systems, vol. 3, Kluwer Academic Publishers, Boston, Manufactured in The Netherlands, 1994, pp. 231-262.

Hull, Jonathan J., Document Image Similarity and Equivalence Detection, International Journal on Document Analysis and Recognition, vol. 1, No. 1, Ricoh California Research Center, Menlo Park, California, U.S.A., 1998, 17 pages.

Hull, Jonathan, J., Document Matching on CCITT Group 4 Compressed Images, SPIE Conference on Document Recognition IV, SPIE vol. 3027, Ricoh California Research Center, Menlo Park, California, U.S.A. 1997, pp. 82-87.

Hunter, Roy, et al., International Digital Facsimile Coding Standards, Proceedings of the IEEE, vol. 68, No. 7, Jul. 1980, pp. 854-867.

Phillips, Ihsin, T. et al, CD-ROM Document Database Standard, Proceedings of the 2nd IDCAR, IEEE, 1993, pp. 478-483.

Smeaton, A.F, et al., Using Character Shape Coding for Information Retrieval, Proceedings of the 4th IDCAR, IEEE, 1997, pp. 974-978.

Spitz, A. Lawrence, Using Character Shape Codes For Word Spotting in Document Images, Shape, Structure and Pattern Recognition, Nahariya, Israel, Oct. 4-6, 1994, World Scientific, Singapore, New Jersey, London, Hong Kong, pp. 382-389.

Spitz, A. Lawrence, Skew Determination in CCITT Group 4 Compressed Document Images, Proceedings of the Symposium on Document Analysis and Information Retrieval, Xerox Palo Alto Research Center, Palo Alto, California, U.S.A., 1992, pp. 11-25.

CCITT Compression, downloaded from http://www.advent.co.uk/ccitt.html, Advent Imaging, 1998, 3 pages.

Hull, Jonathan, J., Document Image Matching and Retrieval With Multiple Distortion-Invariant Descriptors, International Association for Pattern Recognition Workshop on Document Analysis Systems, World Scientific, Singapore, New Jersey, London, Hong Kong, 1995, pp. 379-396.

* cited by examiner

| Top N Choices | 1 | 3 | 10 | 20 |
|---|---|---|---|---|
| Recall Rate | 86.0% | 91.4% | 94.2% | 95.2% |

FIG. 11

| N | Top Choice | Top 5 Choices |
|---|---|---|
| 3 | 91.1% | 94.2% |
| 5 | 90.1% | 95.2% |
| 3-5 | 92.5% | 95.2% |

COMPRESSED DOCUMENT MATCHING

The present patent application is a continuation of Application No.: 10/058,169 filed Jan. 25. 2002, which is now U.S. Pat. No. 6,928,435 which is a continuation of Application No. 09/186,041, filed Nov. 3, 1998, which is issued as U.S. Patent No. 6,363,381.

FIELD OF THE INVENTION

The present invention relates to the field of document management, and more particularly to detecting duplicate documents.

BACKGROUND OF THE INVENTION

With the increased ease of creating and transmitting electronic document images, it has become common for document images to be maintained in database systems that include automated document insertion and retrieval utilities. Consequently, it has become increasingly important to be able to efficiently and reliably determine whether a duplicate of a document submitted for insertion is already present in a database. Otherwise, duplicate documents will be stored in the database, needlessly consuming precious storage space. Determining whether a database contains a duplicate of a document is referred to as document matching.

In currently available image-content based retrieval systems, color, texture and shape features are frequently used for document matching. Matching document images that are mostly bitonal and similar in shape and texture poses different problems.

A common document matching technique is to perform optical character recognition (OCR) followed by a text based search. Another approach is to analyze the layout of the document and look for structurally similar documents in the database. Unfortunately, both of these approaches require computationally intensive page analysis. One way to reduce the computational analysis is to embed specially designed markers in the documents, that the documents can be reliably identified.

Recently, alternatives to the text based approach have been developed by extracting features directly from images, with the goal of achieving efficiency and robustness over OCR. An example of such a feature is word length. Using sequences of word lengths in documents as indexes, matching documents may be identified by comparing the number of hits in each of the images generated by the query. Another approach is to map alphabetic characters to a small set of character shape codes (CSC's) which can be used to compile search keys for ASCII text retrieval. CSC's can also be obtained from text images based on the relative positions of connected components to baselines and x-height lines. In this way CSC's can be used for word spotting in document images. The application of CSC's has been extended to document duplicate detection by constructing multiple indexes using short sequences of CSC's extracted from the first line of text of sufficient length.

A significant disadvantage of the above-described approaches is that they are inherently text line based. Line, word or even character segmentation must usually be performed. In one non-text-based approach, duplicate detection is based on horizontal projection profiles. The distance between wavelet coefficient vectors of the profiles represents document similarity. This technique may out-perform the text-based approach on degraded documents and documents with small amounts of text.

Because the majority of document images in databases are stored in compressed formats, it is advantageous to perform document matching on compressed files. This eliminates the need for decompression and recompression and makes commercialization more feasible by reducing the amount of memory required. Of course, matching compressed files presents additional challenges. For CCITT Group 4 compressed files, pass codes have been shown to contain information useful for identifying similar documents. In one prior-art technique, pass codes are extracted from a small text region and used with the Hausdorff distance metric to correctly identify a high percentage of duplicate documents. However, calculation of the Hausdorff distance is computationally intensive and the number of distance calculations scales linearly with the size of database.

SUMMARY OF THE INVENTION

A method and apparatus for determining if a query document matches one or more of a plurality of documents in a database are disclosed. A bit profile of the query document is generated based on the number of bits required to encode each of a plurality of rows of pixels in the document. The bit profile is compared against bit profiles associated with the plurality of documents in the database to identify one or more candidate documents. Endpoint features are identified in the query document and a set of descriptors for the query document are generated based on locations of the endpoint features. The set of descriptors generated for the query document are compared against respective sets of descriptors for the one or more candidate documents to determine if the query document matches at least one of the one or more candidate documents.

Other features and advantages of the invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which.

DETAILED DESCRIPTION

A two-stage approach to detecting duplicates of compressed documents is disclosed herein in various embodiments. Although the embodiments are described primarily in terms of CCITT Group 4 compressed documents, the invention is not so limited and may be applied to other types of documents, including, but not limited to, CCITT Group 3 compressed documents and TIFF formatted files.

Terminology

The following terms, phrases and acronyms appear throughout this specification. Unless a different meaning is clear from context, the following definitions apply:

Recall Rate: percentage of correct matches in a database that are returned.

MMR: Modified Modified Relative Element Address Designate.

Text Concentration: lines of text per unit area (e.g., 5 lines per inch).

CCITT: Consultative Committee for International Telegraph and Telephone.

TIFF: Tagged Image File Format.

G3 or Group 3 Compression: document image compression technique described in CCITT Specification T.4

G4 or Group 4 Compression: document image compression technique described in CCITT Specification T.6

Ground Truth Information: known correct information

Wavelet: statistical feature that describes the shape of an image

Document Image: digital image of a sheet of paper or similar medium

Scanline: a row of pixels in a document image.

Halftone: simulation of gray-scale image using resolute black and white dots

Down Sample: a technique for reducing resolution by averaging or otherwise combining multiple pixels into a single pixel.

Huffman Codes: bit codes for encoding runs of pixels.

Figure 1:
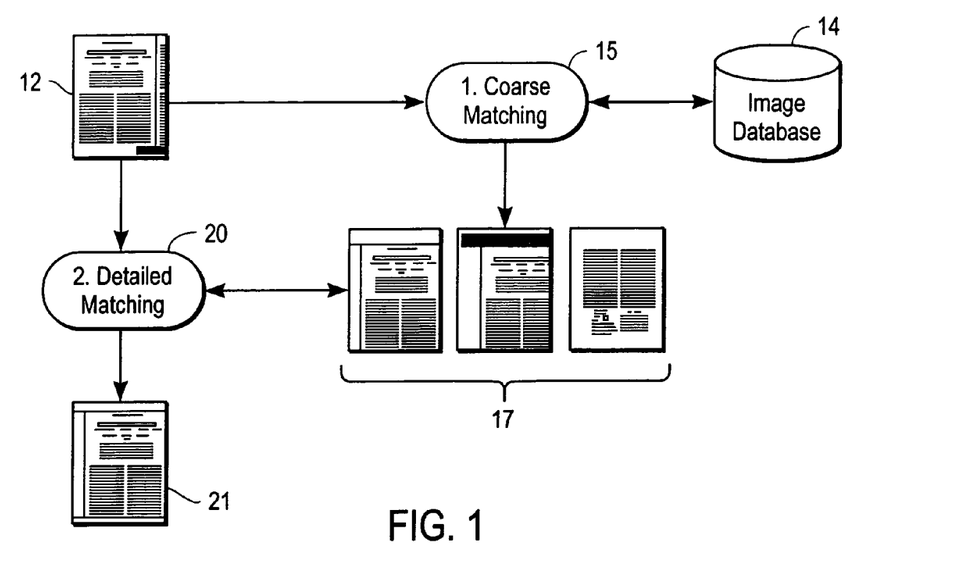
FIG. 1 illustrates an overview of two-stage document matching according to one embodiment.

FIG. 1 illustrates an overview of two-stage document matching according to one embodiment. In a coarse matching stage 15, a compressed file 12 or other query document is scanned to produce a bit profile. Global statistics such as line spacing and text height are calculated from the bit profile and used to narrow the field of documents to be searched in an image database 14. The bit profile is then cross-correlated with precomputed bit profiles of documents in the search space to identify candidates 17 for a detailed matching stage 20. If multiple candidates 17 are generated in the coarse matching stage 15, a set of endpoint features is extracted from the query document for detailed matching in the detailed matching stage 20. Endpoint features contain sufficient information for various levels of processing, including page skew and orientation estimation. In addition, endpoint features are stable, symmetric and easily computable from commonly used compressed files including, but not limited to, Group 4 compressed files. Endpoint features extracted in the detailed matching stage 20 are used to correctly identify a matching document 21 in a high percentage of cases.

1. Coarse Matching Stage

The primary goal of the coarse matching stage 15 is to produce a set of candidates with a high recall rate. Therefore, the features used must be easy to compute and robust to common imaging distortions. The most obvious feature available without decompression is the compressed file size. Unfortunately, compressed file sizes can vary significantly between matching documents due to inconsistent halftone qualities in the original and photocopied images or the halftoning effects near edges of documents. Almost as accessible but much more informative is the compressed size of each scanline.

Figure 2:
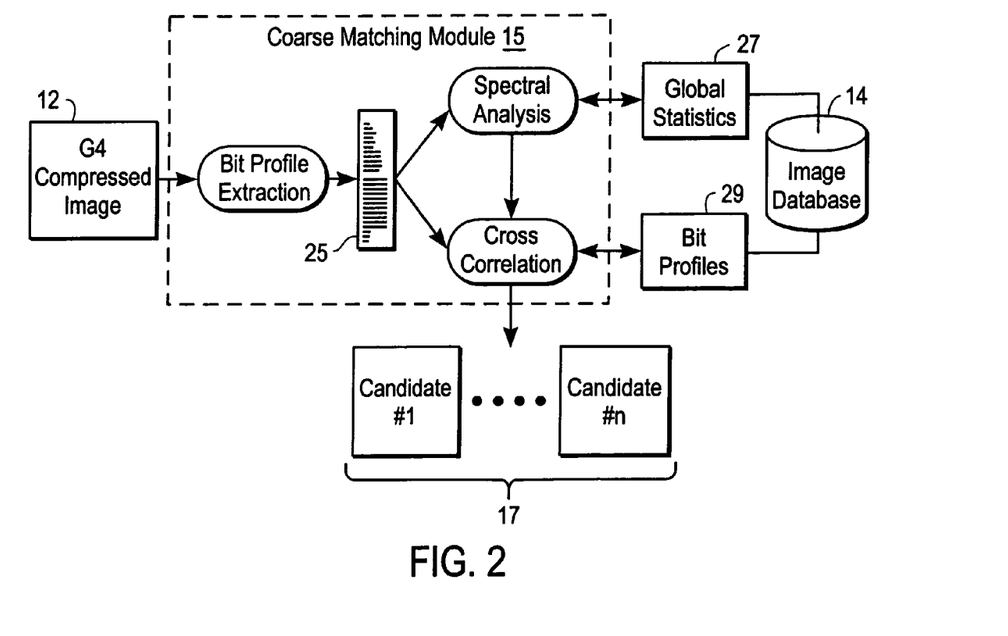
FIG. 2 illustrates the coarse matching stage according to one embodiment.

FIG. 2 illustrates the coarse matching stage according to one embodiment. Initially, a one pass scan through a G4 or otherwise compressed query image 12 produces a compression bit profile 25. Spectral analysis techniques are then applied to the bit profile 25 to generate robust global statistics. The global statistics of the query image 12 are compared to precomputed global statistics 27 of document images in the database to generate a set of initial candidates. The precomputed bit profiles 29 of the initial candidates are cross correlated against the bit profile 25 of the query image 12 to produce a hypothesis that includes set of ranked candidates 17. Further processing may be avoided if a highly confident match is found by cross correlation.

1.1 Bit Profile Extraction

The Group 4 compression standard defines a two-dimensional, run-length based coding scheme (MMR) in which each scanline is encoded relative to the line above. Depending on the patterns of consecutive runs on these two lines, the appropriate Huffman codes are generated. Because MMR coding is deterministic, the same image pattern will produce a similar compression ratio regardless of its location in a document. Consequently, a useful feature to compute is the number of bits required to encode each row of pixels. In general, halftones require the most bits for encoding; texts require fewer bits, and background even fewer. For images which are text-dominant and oriented horizontally, the bit profiles should show peaks and valleys corresponding to text lines. An example of the peaks and valleys that result from text lines is shown by region 41 of the bit profile in FIG. 3. The bit profile 25 has been generated from a compressed version of the document image 40.

In contrast to the horizontal projection of ink density (e.g., average number of black pixels in each line), the bit profile shows where the information actually is. For example, a large black region often encountered at edge of photocopied documents (e.g., region 43 in FIG. 3) will have little effect on the bit profile 25, whereas a large peak will be produced in an ink density profile. In fact, the bit profile 25 will not look much different if the page is in reverse video. Moreover, the bit profile 25 conveys more structural information about the distribution of inks on a scanline than does an ink density profile. For a set of point sizes commonly occurring in documents, the compression ratio (in normalized units) for full page-width text lines is quite consistent, making them distinguishable from halftones, whereas text and halftones can have similar ink densities.

1.2 Hypothesis Generation

In many cases, the bit profile carries too little information to uniquely identify a single document. However, duplicate documents will usually have similar profiles. Direct comparison of bit profiles based on distance calculation can fail due to even small vertical translations of the bit profiles relative to one another. Therefore, in at least one embodiment, cross correlation is used. Cross correlation of profile vectors can be efficiently computed as products of their Fourier transforms. Cross correlation also produces a vertical registration which may be useful for identifying corresponding sections in a pair of images for local feature extraction. To further reduce the computational cost, global document statistics are calculated and used to confine the search space.

Figure 3:
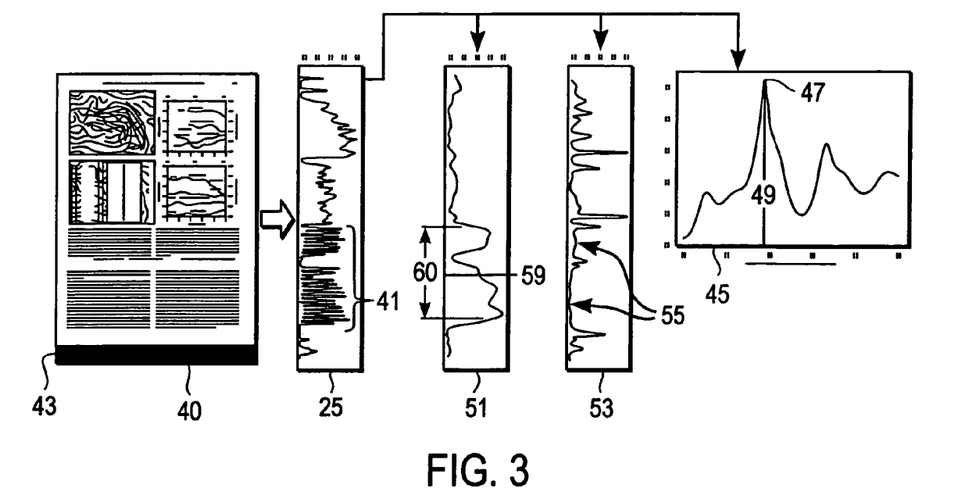
FIG. 3 illustrates a query document and its corresponding bit profile, bandpass filtered profile, phase group delay graph and power spectrum density.

Several global statistics can be extracted from bit profiles. The periodic nature of bit profiles suggests that spectral properties will be more useful than statistical moments. The dominant line spacing, the number of text lines and the location of the text provide a good first level characterization of a document, and these statistics can be readily extracted from bit profiles in the spectral domain. In one embodiment, the Power Spectrum Density (PSD) is used to analyze the frequency constituents of a bit profile. FIG. 3 shows a PSD 45 that has been calculated from the bit profile 25. The dominant line spacing of the query image 40 (or compressed version thereof) can be directly calculated from the highest peak 47 in the PSD 45 Although spectral analysis does not provide a quantitative measure of the number of text lines in the query image 40, the energy under peak frequency (shown by arrow 49) in the PSD 45 is a good indication of the amount of text on the page. In one embodiment, the location of the text lines in the query image is estimated by applying a bandpass filter, centered at the dominant line spacing frequency, to the bit profile 25. The filtered signal will have large amplitude at text locations, as shown by text energy profile 51. Sections of the bit profile which are linear in phase correspond well to text blocks, as shown by the constant, low valued regions 55 in the phase group delay graph 53 (plotted in radians). In one embodiment, a centroid 59 of the text energy profile 51 and the width of 90% energy span 60 are used as an estimation for text location and concentration. In one embodiment, the text location and concentration, along with peak frequency and total text energy, are used as global statistics to define a search window in the space of database images. Other global statistics or different combinations of global statistics may be used in alternate embodiments.

1.3 Feature Analysis

Figure 4:
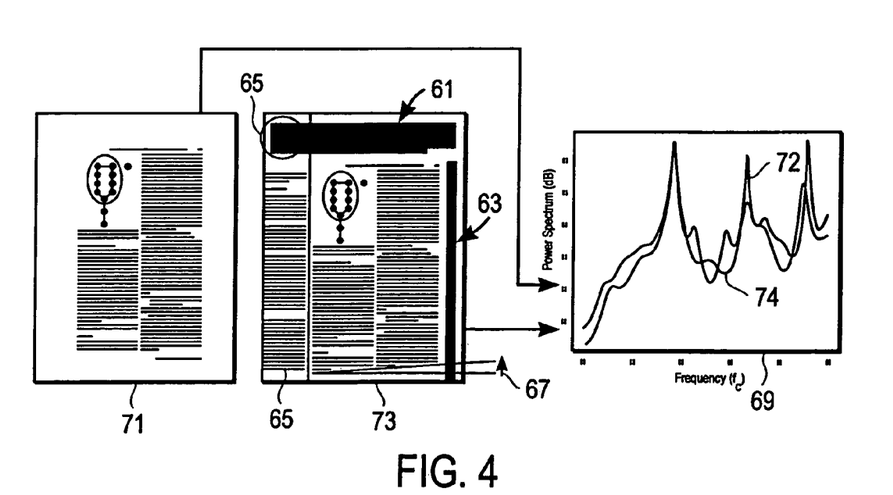
FIG. 4 illustrates commonly seen deformations between two matching document images and their corresponding power spectrum densities.

At this point, it is worth discussing the robustness of the bit profile feature and global statistics with respect to various deformations. FIG. 4 illustrates some commonly seen deformations between two matching document images. A useful observation in analyzing these problems is the following: if the two pages are not skewed relative to each other, then the bit profile of the noisy image contains the bit profile of the clean image superimposed, by addition, with the bit profile of everything else on the page. As mentioned, large, uniformly black regions 61, 63 at the top and side of the page have little effect on the bit profile. However, the bit profile can be altered significantly by gray regions dithered as halftones (e.g., region 65). Halftones at the top or bottom of the page appear as isolated peaks in the bit profile, and they can be detected and removed because their local averages are too high to be text lines. Halftones along the length of the page add random noise to the bit profile. However, these random noises are usually quite uniform in density and do not significantly affect the PSD. Extraneous text 65 on the side of the page can have more dramatic effect on the PSD, however. The text energy for the side content 65 will either be absorbed into that of the body text, when their line spacings are the same, or produce a separate, usually smaller peak, when their line spacings differ.

One of the most serious defects is skew caused by rotation of the image on the page. Rotation 67 has the effect of locally averaging horizontal projections in bit profiles, making the peaks and valleys less prominent. The larger the skew, the greater the effect of smoothing. Although smoothing the bit profile does not change the dominant frequency, it does change the energy distribution, pushing the energy under the peak frequency towards lower end of the spectrum, and making detection much harder. This is illustrated by the PSD 69 of FIG. 4 in which power densities 72 and 74 are plotted for unskewed image 71 and skewed image 73, respectively. In one embodiment, a preprocessing step is applied to the profile before spectral estimation to remove low frequency energies. Overall, the global statistics are quite robust to image distortions. However, cross correlation of bit profiles is less tolerant to these distortions.

There are other relevant factors such as resolution and encoding formats that contribute to variations in the bit profiles. As result of the two-dimensional encoding and fixed Huffman coding tables used in Group 4 compression, the number of bits required for compression does not scale linearly with the length of runs. Although a change in horizontal resolution (e.g., caused by magnification) does not have a constant scaling effect across the bit profile, the residual errors tend to be negligible. Down sampling the bit profile, which adjusts for different vertical resolutions, also helps to reduce local variations.

While G4 compressed images have been emphasized, the implications of the G3 compression scheme are worth mentioning. The differences between the bit profiles of a G3 and a G4 encoded file of the same image reside in the one-dimensional (1D) and two-dimensional (2D) coded scanlines. Since 2D coding is usually more efficient that 1D coding, the G3 encoded bit profile is the G4 encoded bit profile plus a periodic waveform with a frequency of k, where k is the frequency of 1D coded lines. In Group 3, the recommended settings for k is every 2 lines at 200 dots per inch (dpi) and every 4 lines for higher resolutions. In practice, the differences tend to be small relative to the peak heights and these frequencies are usually too high to be confused with the actual line spacing. This type of periodic noise can also occur, independently of the encoding scheme, in TIFF formatted files, where images are often encoded as fix sized strips to facilitate manipulation. As a result, the first row of each strip is effectively 1D encoded. Varying the RowsPerStrip parameter setting will produce a corresponding change in the PSD. As with the periodic waveform of frequency k in G3, the noise caused by effective 1D coding in TIFF formatted files is relatively small compared to the peaks produced by text lines and can be neglected.

2. Detailed Matching

Because visually different documents can have similar compression bit profiles, a second stage process may be necessary to resolve any uncertainty in the list of candidates produced by the coarse matching stage. According to one embodiment, more information is obtained by extracting a set of endpoint features from the G4 or otherwise compressed query image. After analysis, a subset of these endpoint features are identified as markers. Descriptors based on the positions of these markers are generated for document indexing. Cross validation is carried out if a set of document candidates are provided by the coarse matching procedure. The following sections describe endpoint feature extraction and descriptor generation in further detail.

2.1 Endpoint Extraction

Figure 5A:
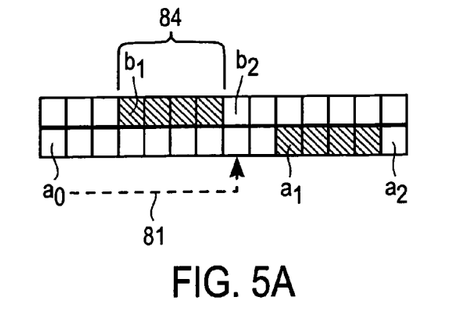
FIG. 5A illustrates an example of reference points used in CCITT Group 4 encoding for pass mode encoding.
Figure 5B:
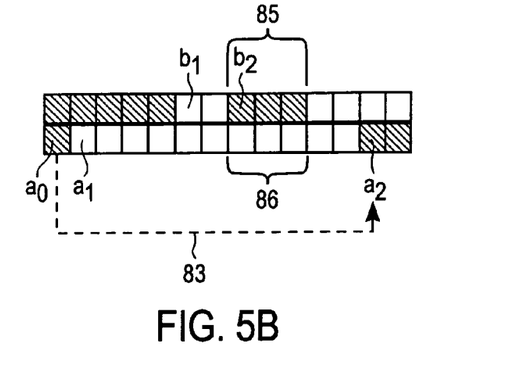
FIG. 5B illustrates an example of reference points used in CCITT Group 4 encoding for horizontal mode encoding.

To facilitate an understanding of endpoint feature extraction, it is helpful to briefly discuss the Group 4 compression scheme. In the Group 4 compression format, each scan line is encoded with respect to the line above. Referring to FIGS. 5A and 5B, the starting points for two consecutive pixel runs, referred to as changing elements, on both lines are identified at any time with respect to the current encoding point, a0. Based on the relative positions among these changing elements, one of three possible modes, horizontal, vertical or pass mode, is selected for encoding. After encoding, a0 is moved forward and the process is repeated. This is indicated by arrows 81 and 83 in FIGS. 5A and 5B, respectively. During decoding, the decoded mode is used in combination with known changing elements (a0, b1, b2) to determine positions of a1 and/or a2. Element a0 is then moved forward as with encoding. Therefore, the mode information is decoded first. Positions of the changing elements are also maintained at all times.

Pass codes occur at locations that correspond to bottom of strokes (white pass) or bottom of holes (black pass). For Roman alphabets, these feature points occur at the end of a downward vertical stroke or the bottom of a curved stroke, as shown by the pass code diagram 87 in FIG. 6 (each bold square dot 88 indicates a pass code location). The alignment of pass codes near baselines and the structural information they carry make them useful in a variety of tasks such as skew estimation and text matching. Equally important is the fact that they can be extracted easily from a Group 4 compressed file.

While pass codes are useful, they also have limitations. First, pass codes are unstable in the sense that while all white pass codes correspond to bottom of strokes, not all bottom of strokes are represented by pass codes. Because of the context-dependent nature of Group 4 encoding modes, identical local patterns of changing elements can be encoded differently.

For example, the black run 84 starting at b1 in FIG. 5A will produce a pass code. However, the black run 85 starting at b2 in FIG. 5B will not generate a pass code, as it would if a1 were to shift one pixel to the right. Instead, the bottom of a stroke 86 at b2 is completely shadowed by the horizontal mode encoding which spans a0 to a2.

Another limitation of pass codes is that they are asymmetric. While the bottom of a stroke or a hole may be captured by a pass code, pass codes yield no information about the top of the stroke or hole. As illustrated in pass code diagram 87 of FIG. 6, for example, the bottom of a "d" often contains two pass codes, one white 89A and one black 89B, while no feature point on the top of the character is captured.

Figure 6:
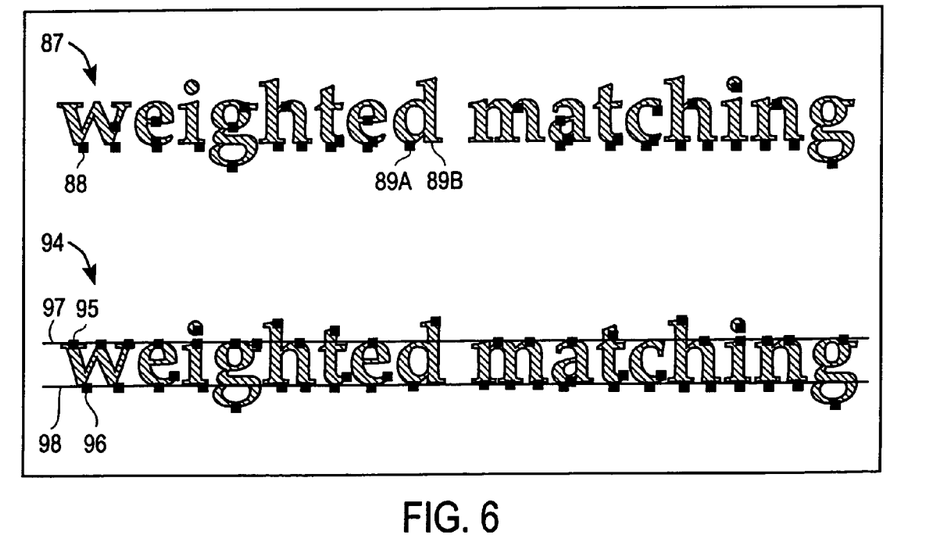
FIG. 6 illustrates differences between pass codes and endpoints.

Because of the limitations of pass codes, in at least one embodiment of the detail matching stage, endpoint features are extracted directly from the changing elements in a compressed query image. Two types of endpoints are extracted: up and down endpoints. Down endpoints are bottoms of strokes, similar to what white pass codes capture. However, an important difference between down endpoints and pass codes is that down endpoints are extracted by directly comparing the positions of changing elements a1 and b2, eliminating the possibility of obscurity by horizontal encoding. Thus, in contrast to pass codes, all bottoms of strokes are down endpoints and vice-versa. The tops of strokes are similarly extracted as up endpoints using changing elements a2 and b1. An endpoint diagram 94 in FIG. 6 illustrates the features captured by up and down endpoints, and is positioned beneath pass code diagram 87 to illustrate the differences between features captured by pass codes and by endpoints. The endpoint diagram 94 also illustrates that down endpoints 96 align primarily at the baseline of a text line, while up endpoints 95 align primarily at the x-height line 97 (an x-height line is a line determined by the top of a lower case "x").

Figure 7A:
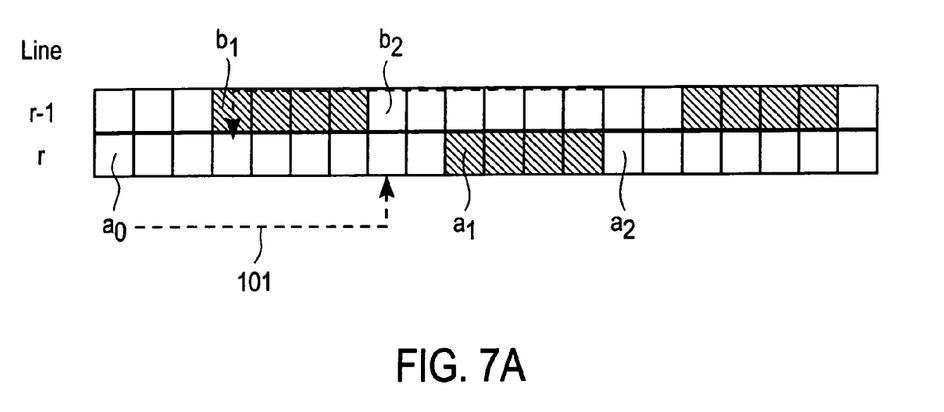
FIG. 7A illustrates down endpoint extraction according to one embodiment.
Figure 7B:
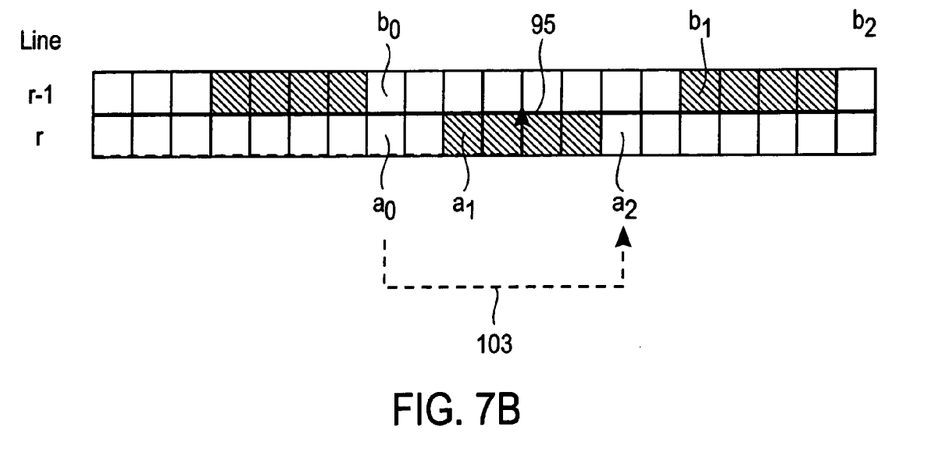
FIG. 7B illustrates up endpoint extraction according to one embodiment.

FIGS. 7A and 7B are provided along with the following psuedocode to illustrate the manner in which up and down endpoints are identified.

```
if ((pixel(a0) == WHITE) and (a1>b2))
{
    down endpoint at (b1+(b2-b1+1)/2, r-1)
    move a0 to b2
}
if ((pixel(a0) == WHITE) and (b1>a2) and (b0<a1))
{
    up endpoint at (a1+(a2-a1+1)/2, r)
    move a0 to a2
}
```

Referring to FIG. 7A, a0 is white and a1 occurs after b2. Thus, the first conditional statement in the above pseudocode listing is satisfied and a down endpoint 96 is therefore specified on the r-1 line at a point approximately midway in the run from b2 and b1. Element a0 is advanced to a location in line r beneath b2, as shown by arrow 101.

Referring to FIG. 7B, a0 is white, b1 occurs after a2, and b0 occurs before a1. Consequently, the second conditional statement in the above pseudocode listing is satisfied and an up endpoint 95 is therefore specified on the r line at a point approximately midway in the run from a1 to a2. Element a0 is advanced to a2, as shown by arrow 103.

Endpoints have several advantages over pass codes. First, endpoints are more stable; the same feature points will not be obscured by different encoding modes. Also, endpoints provide information around both the x-height line and baseline of a text line. This allows for information such as text height, page orientation and ascenders to be extracted. The symmetric nature of the up and down endpoints is also beneficial in dealing with inverted pages. If the page is inverted, the endpoints for the correctly oriented page can be obtained by switching the up and down endpoints followed by a simple coordinate remapping. It is not necessary to re-scan the compressed document. By contrast, because pass codes are asymmetric, it is usually necessary to invert the image and recompress to obtain the corresponding feature points. In addition, endpoints are detected based on relative positions of changing elements, so there positions are as easy to calculate as pass codes.

2.2 Document Indexing

Figure 8:
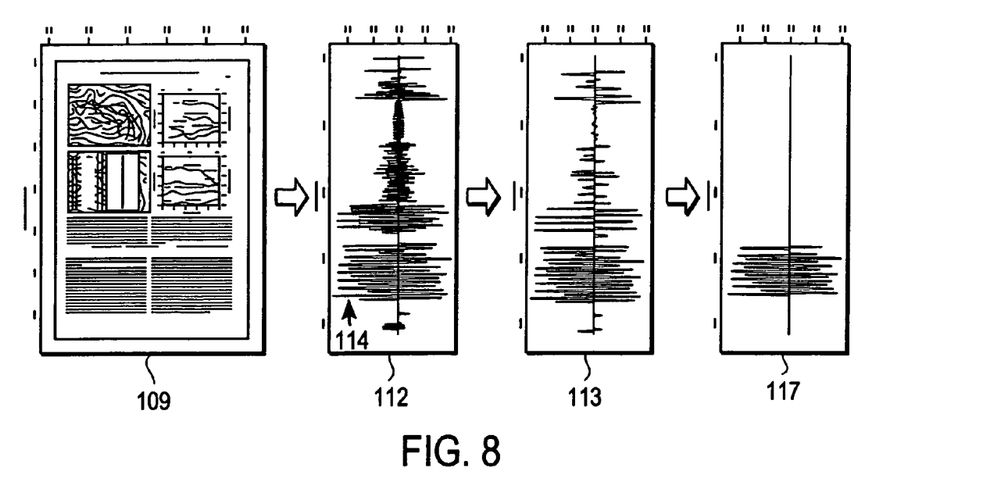
FIG. 8 illustrates a set of endpoints after skew correction and a corresponding horizontal projection, local maxima of projection and matching local maxima.

Following feature extraction, the two dimensional endpoint information is converted to a one dimensional representation for efficient indexing. Several operations are involved in this conversion. First, page skew is estimated and corrected based on the endpoints. The smoothed horizontal projection profiles for the skew corrected up and down endpoints, which will be referred to as U profile and D profile, are used to locate text lines. Because x-height lines must be above their corresponding base lines, the D profile must lag behind the U profile. The maximum correlation between the U profile and D profile is calculated within an offset constrained by the dominant line spacing, which is obtained from spectral analysis of the profiles. In the correlated profile, wherever a local maximum in the U profile matches up with a local maximum in the D profile, separated by a distance equal to text height, there is a good possibility that a text line is located. To improve on the correlation between the U and D profile, all but the local maximum in the U and D profiles are zeroed within a range just short of twice the line spacing. This tends to filter out all but the x-height lines from the U profile and the baselines from the D profile. Correlation is then performed on the profile of local maxima. FIG. 8 illustrates a set of endpoints 109 that have been extracted from a query image and skew corrected; a horizontal projection of up and down endpoints 112 (the down endpoints are the negatively projecting values 114 that form the D profile); local maxima of U and D profile projection 115; and matching local maxima of U and D profiles 117.

Figure 9:
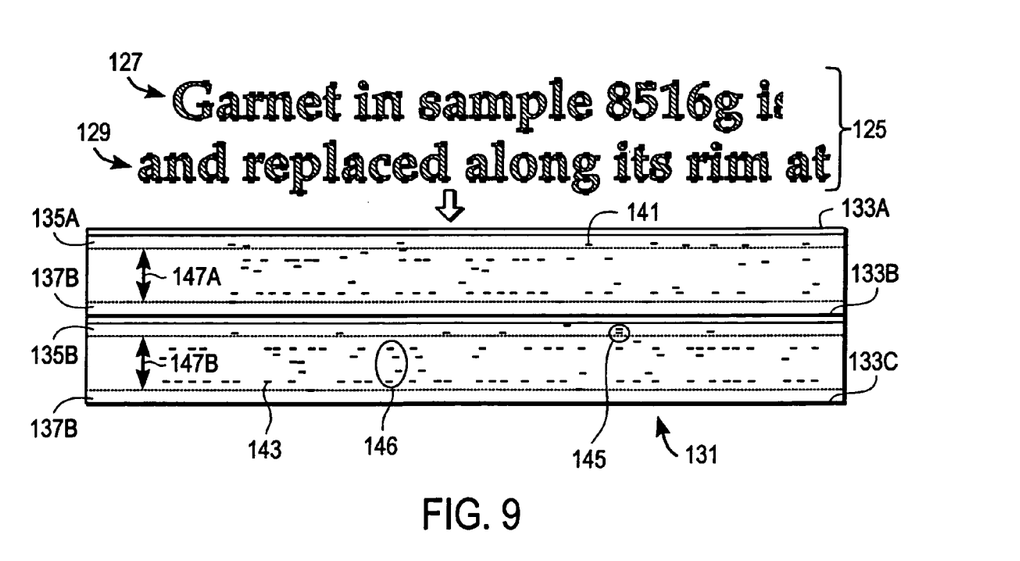
FIG. 9 illustrates an exemplary set of endpoints located within a pair of text line segments.

Given a set of text line locations, the endpoints within each text line zone are extracted. Because the endpoints within a given text line can be used to locate the x-height line and baseline, regions within the text line called ascender and descender zones can be defined. FIG. 9 shows an image region 125 containing two text line segments 127, 129 and the up and down endpoints contained within each segment. The corresponding endpoint map 131 includes text line boundaries 133A-133C shown in solid lines, and ascender zones 135A, 135B and descender zones 137A, 137B delimited by dashed lines. Up and down endpoints are represented in the endpoint map 131 by upward pointing triangles 141 and downward pointing triangles 143, respectively.

Several observations can be made from the illustration in FIG. 9. First, significant information can be deduced from the relative positions of up and down endpoints. For examples, diacrits such as dots and "i"s and "j"s are well indicated by the presence of both up and down endpoints at the same x location in the ascender zones 135A, 135B (e.g., as shown by arrow 145). Moreover, up endpoints in the middle zone 147A, 147B usually represent upward curves in characters such as "e", "s" and "t". Character "c" is reflected by two opposing down and up endpoints in the middle zone (e.g., as shown by arrow 146).

According to one embodiment, sequences of endpoints extracted from a relatively small text region are used to provide an index for document matching. With well-defined reference lines, there are several possibilities to encode endpoints as sequences. From visual inspection, it can be observed that endpoints occurring inside the x-height zone are more susceptible to noise due to touching, fragmentation, serifs and font style variations. Therefore, in one embodiment, endpoints in the middle zones are ignored and only up endpoints above the x-height line (i.e., in the ascender zone) and down endpoints below the baseline (i.e., in the descender zone) are used as markers. Endpoints from other regions of a text line may be used as markers in alternate embodiments.

Figure 10:
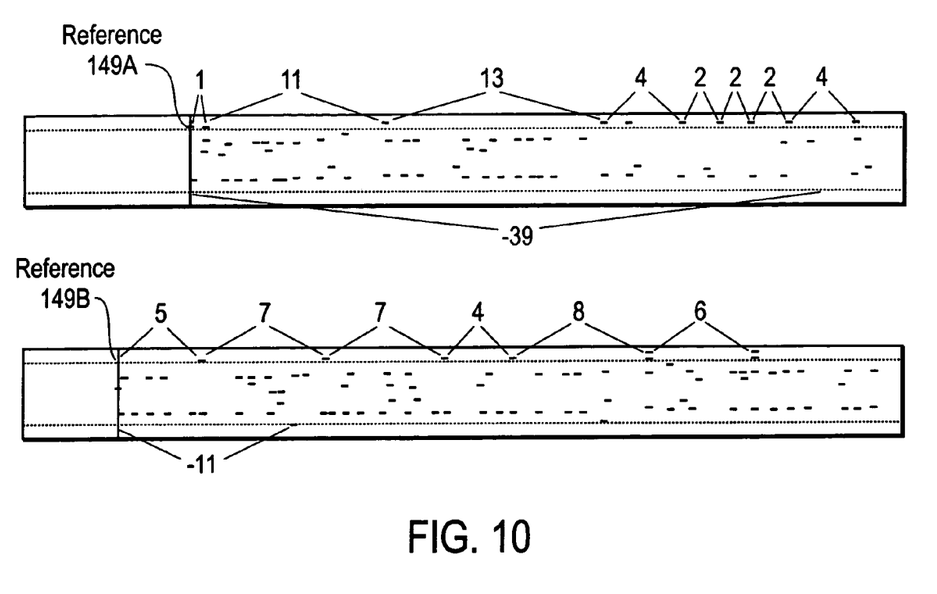
FIG. 10 illustrates quantization of distances between consecutive endpoint markers.

In one embodiment, sequences of quantized distances between consecutive markers are used as descriptors. The quantization of distances between consecutive markers is illustrated in FIG. 10. Positive values are used to indicate distances between up endpoint markers (i.e., "ascenders") and negative values are used to indicate distances between down endpoint markers (i.e., "descenders"). The left-most endpoint in each text line region is used as a reference point 149A, 149B. Other reference points and distance formats may be used in alternate embodiments. To maintain the two-dimensional structure, distance indicators across text lines are concatenated, separated by a 0. Hence, a string of positive and negative values will be generated for given lines of text. For example, for the lines of text shown in FIG. 10, the string of distance indicators will be:

1, 11, 13, 4, 2, 2, 2, 4, 0, −39
0,
5, 7, 7, 4, 8, 6, 0, −11

Other formats for marker distances may be used in alternate embodiments. For example, marker distances in the ascender and descender zones can be interleaved in strictly left to right order.

In one embodiment, each document in the database is reverse indexed by descriptors formed by respective sequences of N consecutive distances. Similarly, K sequences of N consecutive distances are formed during a query. In one formulation, the weight for each descriptor is inversely proportional to the number of documents it indexes. For example, suppose N is 5 in the example of FIG. 10, then K=(number of distance indicators−N)+1=(19−5)+1=15 sequences $S_1$-$S_{15}$ will be generated as follows:

$S_1$=(1,11,13, 4, 2)
$S_2$=(11,13, 4, 2, 2)

$$S_1 = (1, 11, 13, 4, 2)$$

$$S_2 = (11, 13, 4, 2, 2)$$

$$S_3 = (13, 4, 2, 2, 2)$$

$$\vdots$$

$$S_{15} = (4, 8, 6, 0, -11)$$

By weighting each sequence in inverse proportion to the number of documents it indexes, each of the K sequences, $S_i$, contributes a score of $1/(K*M_i)$ to every one of the $M_i$ documents that $S_i$ indexes. Documents that receive scores greater than a threshold are returned by the detailed matching stage. Large N values will produce fewer, more unique descriptors, but longer sequences are also more susceptible to disruption by noise. Alternative formulations for weighting descriptors and for selecting descriptors may be used without departing from the scope of the present invention.

3. Experimental Results

Experiments have been conducted on a database of 979 document images. Of the 979 images, 292 images (146 pairs) have a matching counterpart. Each of the 292 images is used as a query for retrieving its counterpart from the remaining 978 images. The coarse and detailed matching procedures were tested independently as well as in combination. Results on each experiment will be presented.

3.1 Coarse Matching

In one implementation of the coarse matching algorithm, the original bit profile obtained at the vertical image resolution is down sampled by averaging to 36 dpi. This implies the smallest detectable line spacing is 4 points. At this resolution, the bit profile is smooth enough and yet provides sufficient details for index calculation and profile correlation. During spectral analysis, the dominant line spacing is searched only in the frequency range between 8 and 36 points. The profile values are normalized to bits per inch at 300 dpi (horizontal), and quantized to 8 bits. The sample depth at 8 bits is found experimentally based on the observation that, in various font styles, 8 point texts usually require less than 200 bits per inch for compression at 300 dpi. Scanlines exceeding an average of 255 bits per inch usually contain halftones. Profiles obtained at other image resolutions are (after being vertically resampled at 36 dpi) first scaled proportionally then quantized. No special adjustments are made for Group 3/Group 4 encoded files or the strip size in TIFF format. Thus, 396 bytes of data is produced for a typical 8.5×11 inch page (11 inch×36 dpi×8 bits).

Figure 11:
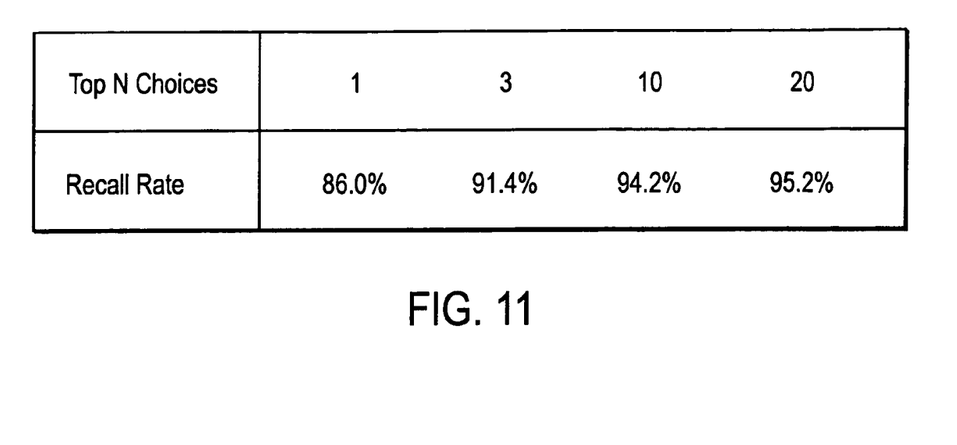
FIG. 11 is a table that summarizes coarse matching recall rates for different values of N.

The recall rates for the top N choices are summarized in the table of FIG. 11. Cross correlation of the bit profiles produced 86% correct on top choice, and 91% correct on top 3 choices. Using the global statistics for indexing, the average number of candidates for cross correlation calculation is reduced by 90% without any loss in the recall rate. The Discrete Fourier Transform of the bit profiles for images in the database are precomputed and stored, so cross correlation can be calculated by a vector product. Therefore, each image query involves extracting the bit profile, filtering by global statistics, followed by approximately 100 vector products of dimension 396.

Figure 12:
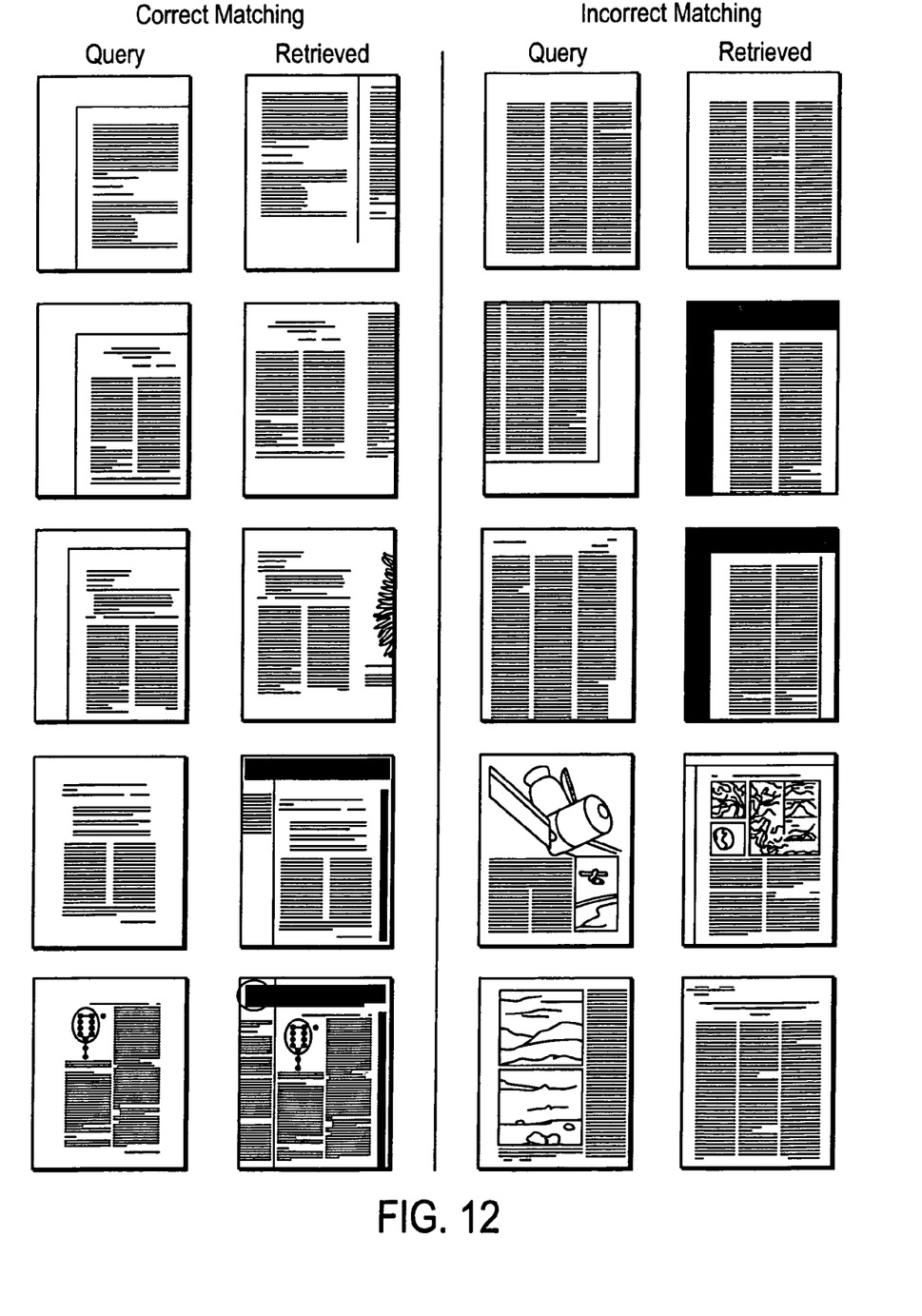
FIG. 12 illustrates examples of correctly and incorrectly matched images.

Examples of correctly and incorrectly matched documents are found in FIG. 12. The correctly matched cases demonstrate the robustness of the features in coping with deformations discussed above. Most errors resulted from skewed images or images containing halftones. Although the quality of halftones does not affect indexing, the quality may significantly affect profile correlation. In addition, problems may be caused by multiple-column pages, especially multiple-column pages that contain halftones in one column and text in the other. Non-collinear columns can lead to aliasing incorrect line spacing estimation. Two pairs of images have scale differences.

It has been observed that line spacing and text energy indices are much more effective in constraining the search space than text location and text extent indices. This is expected because the Fourier transform is poor in spatial localization. However, good frequency isolation is important for discriminating the densely distributed line spacing between pointsize 9 and 12. To improve on text location, a wavelet transform may be used.

3.2 Detailed Matching

In a detailed matching experiment, endpoints were extracted from a 1.5 by 1 inch region from the first body of text in the image using the ground truth information. The text line location algorithm was then applied to detect endpoints in the ascender and descender zones. Although some of those regions contained non-text portions of the image, the line location technique was relied upon to eliminate any feature points not belonging to text lines. After the ascender and descender zones were defined, a sequence of distances between endpoint markers was generated for each patch. Taking every N consecutive distances as an index, multiple descriptors were constructed for a database query. Using the weighting scheme described above, the image receiving the highest score was selected.

Figure 13:
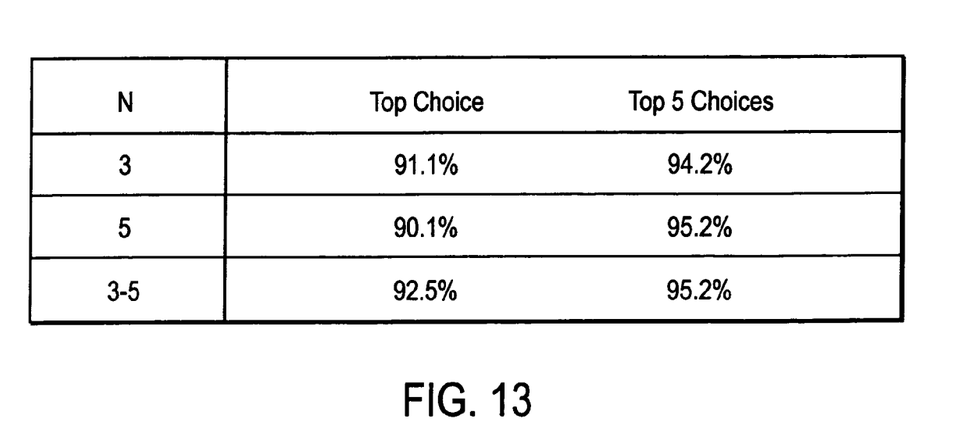
FIG. 13 is a table that summarizes results of detailed matching in a database using different numbers of consecutive distances per descriptor.

Each of the 292 images was used to query into the full set of 979 images. The images themselves are recalled 100% of the time. In 290 of the 292 cases, only the image itself is retrieved as the top choice. In two cases, one additional image was recalled with a tied score. For duplicate detection, a case is considered correct if the counterpart scores highest among the rest of the images without any ties. The results for different values of N are summarized in the table shown in FIG. 13.

Using sequences of three, four and five distances, 92.5% of the duplicate are correctly detected. This performance is comparable to results achieved using more computationally intensive techniques. In addition, the indexing approach has much greater scalability than the distance based strategy. Most of the mistakes are due to noise in the feature points.

Because the projection profile based text line location technique relies on collinearity of text lines across the width of the page, the performance of the technique is affected by misaligned multiple-column documents. One solution to this problem is to use vertical projection profile for column segmentation. Another solution is to perform text line location within vertical slices of the document, and use only the high confidence results to avoid column boundaries.

Spurious feature points occurring beyond text line boundaries can generate false descriptors. Some measures for detecting the horizontal extent of text lines may be provided. Because the feature points have been skew corrected and the positions of the x-height lines and baselines are known, the ends to line segments may be found based on the endpoint profiles discussed above. Furthermore, the regions for descriptor generation can be automatically determined. In the experiment, ground truth information was used to identify corresponding text regions in document images. This registration process may be replaced by an automatic region selection scheme. Generating descriptors for each located text line will increase the database size and reduce recalled precision. One possibility for identifying candidate regions is to base the selection on local feature point densities. Other techniques may also be used without departing from the scope of the present invention.

3.3 Combined Solution

In the combined test, the result of the coarse matching stage is returned if the correlation score of the top choice is greater than 0.85 and the difference between the top and second choice score is more the 0.03. Otherwise, the top twenty choices are passed on for detailed matching. As a result, 70% of the images are accepted after coarse matching, and only 30% of the images require detailed matching. The overall correct rate for the system is 93.8%. Thus, results indicate that coarse matching by profile correlation not only improves execution efficiency, but also eliminates candidates which otherwise would be confused by detailed matching alone. Different results will be achieved by modifying the decision rule. In most cases, the detailed matching stage should be invoked to improve the reliability of detection.

4. Overview of Processing System

Figure 14:
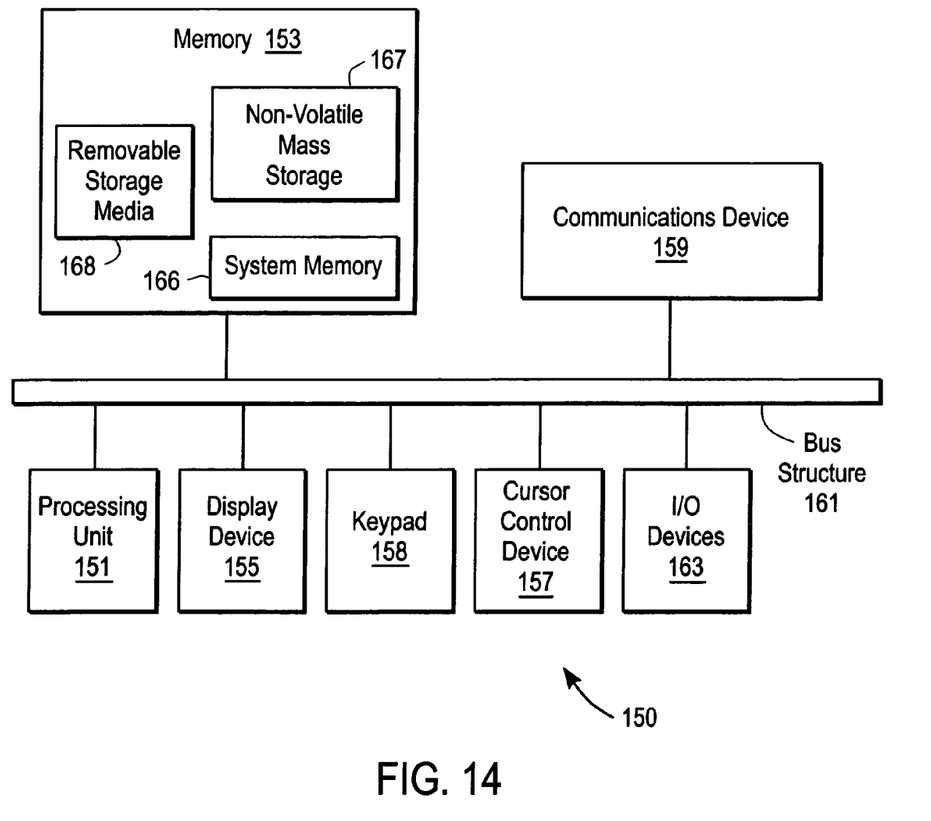
FIG. 14 is a block diagram of a processing system that can be used to perform processing operations used in embodiments of the present invention.

FIG. 14 is a block diagram of a processing system 150 that can be used to perform processing operations used in embodiments of the present invention. The processing system 150 includes a processing unit 151, memory 153, display device 155, cursor control device 157, keypad 158, and communications device 159 each coupled to a bus structure 161. The processing system 150 may be a desktop or laptop computer or a workstation or larger computer. Alternatively, the processing system 150 may be a copy system, facsimile system, or other electronic system in which it is desirable to process compressed document images. The cursor control device 157 may be a mouse, trackball, stylus, or any other device for manipulating elements displayed on display device 155. The keypad 158 may be a keyboard or other device to allow a user to input alphanumeric data into the processing system 150. Other I/O devices 163 may be present according to the specific functions performed by the processing system 150.

The processing unit 151 may include one or more general purpose processors, one or more digital signal processors or any other devices capable of executing a sequence of instructions. The processing unit 151 may also be distributed among multiple computers of the processing system 150. When programmed with native or virtual machine instructions, the processing unit may be used to carry out the above-described coarse matching stage and detailed matching stage operations.

The communications device 159 may be a modem, network card or any other device for coupling the processing system 150 to a network of electronic devices (e.g., a computer network such as the Internet). The communications device may be used to generate or receive a signal that is propagated via a conductive or wireless medium. The propagated signal may be used, for example, for contacting sites on the World Wide Web (or any other network of computers) and for receiving document images, updated program code or function-extending program code that can be executed by the processing unit to implement embodiments of the present invention.

In one embodiment, the memory 153 includes system memory 166, non-volatile mass storage 167 and removable storage media 168. The removable storage media may be, for example, a compact disk read only memory (CDROM), floppy disk or other removable storage device. Program code, including sequences of instructions for performing the above-described coarse matching stage and detailed matching stage operations, may be stored on a removable storage media that can be read by the processing system 150 and used to operate the processing system in accordance with embodiments described herein. The non-volatile mass storage 167 may be a device for storing information on any number of non-volatile storage media, including magnetic tape, magnetic disk, optical disk, electrically erasable programmable read only memory (EEPROM), or any other computer-readable media. Program code and data and program code for controlling the operation of the processing system in accordance with embodiments described herein may be transferred from the removable storage media 168 to the non-volatile mass storage 167 under control of an installation program. A database of document images may also be maintained in the non-volatile mass storage 167.

In one embodiment, when power is applied to the processing system 150, operating system program code is loaded from non-volatile mass storage 167 into system memory 166 by the processing unit 151 or another device, such as a direct memory access controller (not shown). Sequences of instructions comprised by the operating system are then executed by processing unit 151 to load other sequences of instructions, including the above-described program code for implementing the coarse and detailed matching stages, from non-volatile mass storage 167 into system memory 166. Thus, embodiments of the present invention may be implemented by obtaining sequences of instructions from a computer-readable medium, including the above-described propagated signal, and executing the sequences of instructions in the processing unit 151.

Having described a processing system for implementing embodiments of the present invention, it should be noted that the individual processing operations described above may also be performed by specific hardware components that contain hard-wired logic to carry out the recited operations or by any combination of programmed processing components and hard-wired logic. Nothing disclosed herein should be construed as limiting the present invention to a single embodiment wherein the recited operations are performed by a specific combination of hardware components.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method of determining if a query document matches one or more documents in a database, the method comprising:
generating a bit profile of the query document based on the number of bits required to encode each of a plurality of rows of pixels in the document;
applying a filter to the bit profile to estimate a location of text in the query document for comparison with a first plurality of documents from the database; and
comparing the bit profile of the query document against bit profiles associated with the first plurality of documents from the database to determine if the query document matches one or more of the first plurality of documents.

2. The method of claim 1 further comprising:
performing spectral analysis on the bit profile of the query document to determine global statistics of the query document; and
comparing the global statistics of the query document against global statistics associated with a second plurality of documents from the database to identify the first plurality of documents.

3. The method of claim 2 wherein performing spectral analysis on the bit profile to determine global statistics comprises generating an estimation of a dominant line spacing in the query document.

4. The method of claim 2 wherein performing spectral analysis on the bit profile to determine global statistics comprises generating an estimation of a proportion of the query document that is text.

5. The method of claim 2 wherein performing spectral analysis on the bit profile to determine global statistics comprises generating an estimation of a location of text in the query document.

6. The method of claim 2 wherein performing spectral analysis on the bit profile to determine global statistics comprises generating an estimation of text concentration in the document, the estimation of text concentration indicating a lengthwise measure of a proportion of the query document that is text.

7. The method of claim 1 further comprising precomputing the bit files associated with the first plurality of documents and storing the precomputed bit profiles in the database.

8. The method of claim 1 wherein comparing the bit profile of the query document against bit profiles associated with the first plurality of documents comprises cross correlating the bit profile of the query document against the bit profiles associated with the first plurality of documents from the database.

9. The method of claim 8 wherein cross correlating the bit profile of the query document against the bit profiles associated with the first plurality of documents from the database comprises generating respective vector products of the bit profile of the query document the bit profiles associated with the first plurality of documents from the database.

10. The method of claim 9 wherein the query document is determined to match one or more of the first plurality of documents for which the respective vector product exceeds a threshold.

* * * * *